US012762368B2

(12) United States Patent
Kibune

(10) Patent No.: US 12,762,368 B2
(45) Date of Patent: Oct. 13, 2026

(54) PRINTING SYSTEM, INSTRUCTION APPARATUS, CONTROL METHOD OF INSTRUCTION APPARATUS, AND PROGRAM

(71) Applicant: SEIKO EPSON CORPORATION, Tokyo (JP)

(72) Inventor: Shusuke Kibune, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 287 days.

(21) Appl. No.: 18/586,851

(22) Filed: Feb. 26, 2024

(65) Prior Publication Data

US 2024/0289580 A1 Aug. 29, 2024

(30) Foreign Application Priority Data

Feb. 27, 2023 (JP) ................................ 2023-028139

(51) Int. Cl.
*G06K 15/02* (2006.01)

(52) U.S. Cl.
CPC ..... *G06K 15/1836* (2013.01); *G06K 15/1881* (2013.01)

(58) Field of Classification Search
CPC ....................... G06K 15/1836; G06K 15/1881
USPC .................................................. 358/1.9, 1.15
See application file for complete search history.

(56) References Cited

U.S. PATENT DOCUMENTS

| | | | |
|---|---|---|---|
| 6,049,390 | A | 4/2000 | Notredame |
| 6,075,615 | A | 6/2000 | Nakamura |
| 8,264,726 | B2 | 9/2012 | Klassen |
| 8,860,997 | B2 | 10/2014 | Iwasa |
| 9,691,010 | B2 | 6/2017 | Kitagata |
| 2002/0015180 | A1 | 2/2002 | Tominaga |
| 2005/0114267 | A1 | 5/2005 | Miwa |
| 2006/0139679 | A1 | 6/2006 | Barry |

(Continued)

FOREIGN PATENT DOCUMENTS

| | | |
|---|---|---|
| CN | 109495669 | 3/2019 |
| JP | 2007173916 | 7/2007 |

(Continued)

OTHER PUBLICATIONS

NPL: InnovationQ+ by IP.com and IEEE: Results Publication Date Range: Jun. 30, 2005 to Nov. 26, 2024.*

*Primary Examiner* — Quang N Vo
(74) *Attorney, Agent, or Firm* — WORKMAN NYDEGGER

(57) ABSTRACT

A printing system includes a plurality of processing apparatuses, a printing apparatus, and an information processing apparatus. The information processing apparatus includes a first control unit that displays an APP screen including a first apparatus object, a plurality of second apparatus objects associated with the plurality of processing apparatuses, respectively, and a third apparatus object associated with the printing apparatus. When operations of associating the first apparatus object, the second apparatus object, and the third apparatus object are received, the first control unit causes the processing apparatus corresponding to the second apparatus object associated with the first apparatus object to execute RIP processing and causes the printing apparatus corresponding to the third apparatus object associated with the second apparatus object to execute printing processing.

7 Claims, 10 Drawing Sheets

(56) References Cited

U.S. PATENT DOCUMENTS

| | | | | |
|---|---|---|---|---|
| 2007/0024901 | A1* | 2/2007 | Kayama | G06F 3/1204 358/1.15 |
| 2008/0088871 | A1 | 4/2008 | Fukusawa | |
| 2012/0182580 | A1 | 7/2012 | Yamashita | |
| 2012/0224217 | A1 | 9/2012 | Oba | |
| 2013/0169831 | A1 | 7/2013 | Tomi | |
| 2014/0085665 | A1 | 3/2014 | Sheldon | |
| 2014/0104650 | A1 | 4/2014 | Cogan | |
| 2016/0026413 | A1 | 1/2016 | Yamada | |
| 2016/0170688 | A1 | 6/2016 | Komano | |
| 2017/0324877 | A1 | 11/2017 | Tokuchi | |
| 2019/0079703 | A1 | 3/2019 | Tokuchi | |
| 2022/0229616 | A1* | 7/2022 | Wakamatsu | G06K 15/1859 |

FOREIGN PATENT DOCUMENTS

| | | |
|---|---|---|
| JP | 2007-310450 A | 11/2007 |
| JP | 6160761 | 7/2017 |

* cited by examiner

PRINTING SYSTEM, INSTRUCTION APPARATUS, CONTROL METHOD OF INSTRUCTION APPARATUS, AND PROGRAM

The present application is based on, and claims priority from JP Application Serial Number 2023-028139, filed Feb. 27, 2023, the disclosure of which is hereby incorporated by reference herein in its entirety.

BACKGROUND

1. Technical Field

The present disclosure relates to a printing system, an instruction apparatus, a control method of an instruction apparatus, and a program.

2. Related Art

Print data is converted into a raster image by a raster image processor (RIP) and is printed by a printing apparatus. However, in recent years, the printing apparatus has been designed to speed up printing processing, and there is also a demand for faster conversion processing into the raster image by using the RIP.

JP-A-2007-310450 discloses a high-speed rasterizing system by distributed RIP processing including a print manager that distributes jobs to a plurality of RIPs according to job contents to perform parallel processing.

JP-A-2007-310450 is an example of the related art.

However, in the high-speed rasterizing system by the distributed RIP processing disclosed in JP-A-2007-310450, since job management is performed by the print manager, a user cannot set a distribution condition.

SUMMARY

The present disclosure is a printing system including: a plurality of processing apparatuses configured to execute raster image processor (RIP) processing on data to be printed; one or a plurality of printing apparatuses configured to execute printing processing of printing an image based on the data to be printed on a print medium; and an instruction apparatus configured to receive an operation of designating the processing apparatus caused to execute the RIP processing and the printing apparatus caused to execute the printing processing, in which the instruction apparatus includes: a display unit; a control unit configured to display a display screen on the display unit, the display screen including a first apparatus object indicating the instruction apparatus, a plurality of second apparatus objects associated with the plurality of processing apparatuses, respectively, and a third apparatus object associated with the printing apparatus; and an operation unit configured to receive an operation of associating the first apparatus object with the second apparatus object and an operation of associating the second apparatus object with the third apparatus object, and the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

The present disclosure is an instruction apparatus for receiving an operation of designating a processing apparatus configured to execute raster image processor (RIP) processing on data to be printed and a printing apparatus configured to execute printing processing of printing an image based on the data to be printed on a print medium. The instruction apparatus includes: a display unit; a control unit configured to display a display screen on the display unit, the display screen including a first apparatus object indicating the instruction apparatus, a plurality of second apparatus objects associated with a plurality of the processing apparatuses, respectively, and a third apparatus object associated with the printing apparatus; and an operation unit configured to receive an operation of associating the first apparatus object with the second apparatus object and an operation of associating the second apparatus object with the third apparatus object, in which the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

The present disclosure is a control method of an instruction apparatus for receiving an operation of designating a processing apparatus configured to execute raster image processor (RIP) processing on data to be printed and a printing apparatus configured to execute printing processing of printing an image based on the data to be printed on a print medium. The control method of an instruction apparatus includes: displaying a display screen including a first apparatus object indicating the instruction apparatus, a plurality of second apparatus objects associated with a plurality of the processing apparatuses, respectively, and a third apparatus object associated with the printing apparatus; receiving an operation of associating the first apparatus object with the second apparatus object and an operation of associating the second apparatus object with the third apparatus object; and generating control information for causing the processing apparatus corresponding to the second apparatus object associated with the first apparatus object to execute the RIP processing and causing the printing apparatus corresponding to the third apparatus object associated with the second apparatus object to execute the printing processing.

The present disclosure is a non-transitory computer-readable storage medium storing a program causing a computer to execute operations, the computer being mounted on an instruction apparatus configured to receive an operation of designating a processing apparatus configured to execute raster image processor (RIP) processing on data to be printed and a printing apparatus configured to execute printing processing of printing an image based on the data to be printed on a print medium. The operations include: displaying a display screen including a first apparatus object indicating the instruction apparatus, a plurality of second apparatus objects associated with a plurality of the processing apparatuses, respectively, and a third apparatus object associated with the printing apparatus; receiving an operation of associating the first apparatus object with the second apparatus object and an operation of associating the second apparatus object with the third apparatus object; and generating control information for causing the processing apparatus corresponding to the second apparatus object associated with the first apparatus object to execute the RIP processing and causing the printing apparatus corresponding to the third apparatus object associated with the second apparatus object to execute the printing processing.

DESCRIPTION OF EMBODIMENTS

Hereinafter, an embodiment will be described with reference to the accompanying drawings.

1. System Configuration

Figure 1:
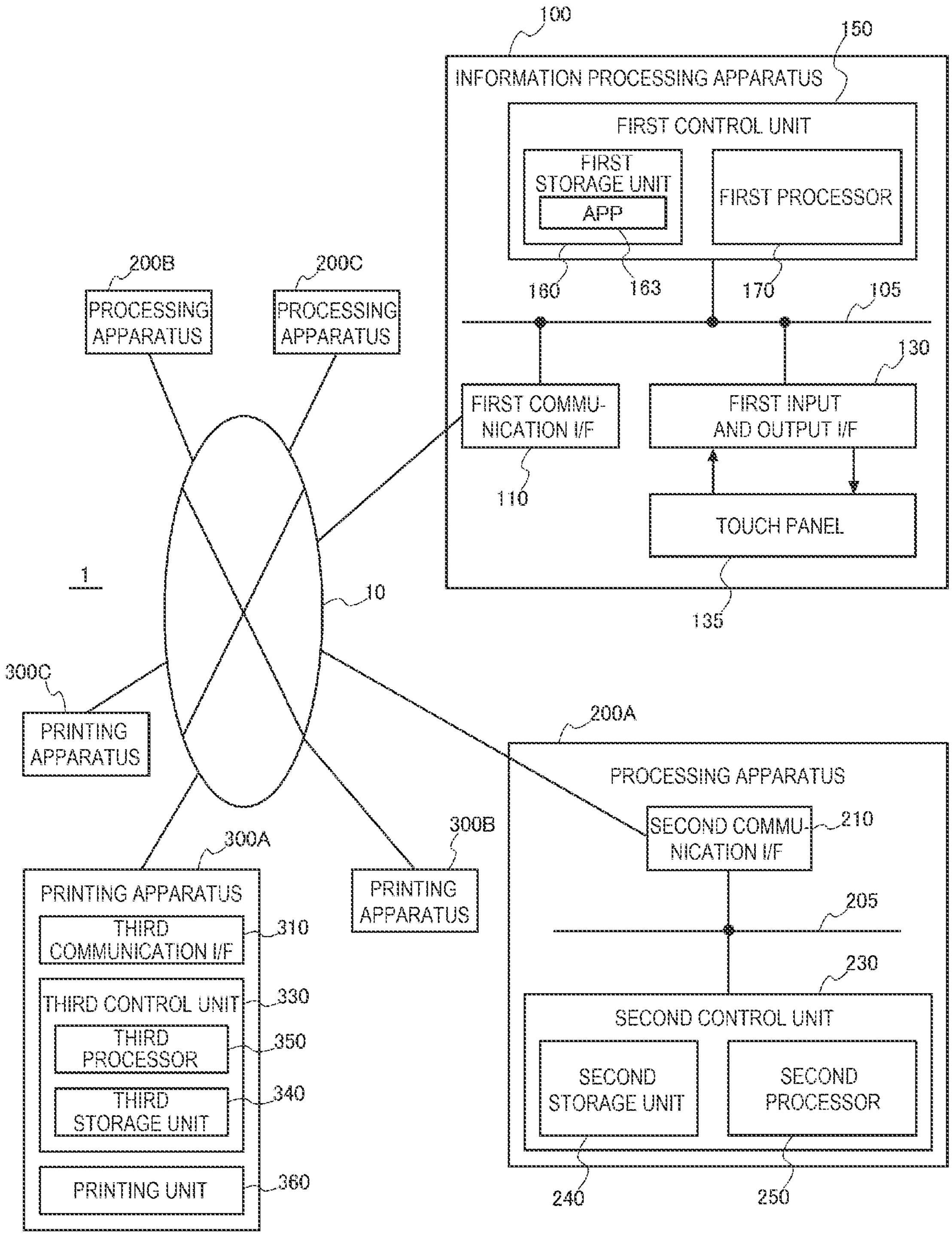
FIG. 1 is a diagram illustrating an example of a system configuration of a printing system.

FIG. 1 is a diagram illustrating a system configuration according to the embodiment.

A system 1 according to the embodiment includes a configuration in which an information processing apparatus 100, a plurality of processing apparatuses 200, and a plurality of printing apparatuses 300 are coupled via a network 10. FIG. 1 illustrates three processing apparatuses 200A, 200B, and 200C and three printing apparatuses 300A, 300B, and 300C, but the number of processing apparatuses 200 and printing apparatuses 300 coupled to the network 10 may be one or more. Hereinafter, the processing apparatuses 200A, 200B, and 200C are collectively referred to as the processing apparatuses 200, and the printing apparatuses 300A, 300B, and 300C are collectively referred to as the printing apparatuses 300. In the system configuration illustrated in FIG. 1, each of the information processing apparatus 100, the processing apparatus 200, and the printing apparatus 300 is coupled to a network in a wired manner, and a coupling form of each apparatus to the network 10 may be wireless.

The network 10 is a wired or wireless transmission path of information transmitted from an apparatus coupled to the network 10. Examples of the network 10 may include various local area networks (LAN) including Ethernet and various wide area networks (WAN). Ethernet is a registered trademark.

The information processing apparatus 100 corresponds to an instruction apparatus.

The information processing apparatus 100 is an apparatus that receives an operation of designating the processing apparatus 200 caused to execute RIP processing and the printing apparatus 300 caused to execute printing processing. The information processing apparatus 100 generates control information based on the received operation. The control information is information for causing the processing apparatus 200 designated by the operation to execute the RIP processing and causing the printing apparatus 300 designated by the operation to execute the printing processing. As the information processing apparatus 100, for example, a tablet personal computer (PC), a notebook PC, a desktop PC, a smartphone, or the like is used.

The processing apparatus 200 is an apparatus that executes the RIP processing. The processing apparatus 200 is implemented by, for example, a notebook PC or a desktop PC. The RIP processing executed by the processing apparatus 200 includes analysis processing, rasterization processing, imposition processing, halftone processing, separation processing, and the like.

The analysis processing is processing of analyzing various types of input page description language (PDL) data.

The rasterization processing is processing of extracting an object such as a text, an image, or a vector graphics included in the PDL data according to an analysis result of the analysis processing and converting the extracted object into bitmap data capable of forming an image.

The imposition processing is processing of disposing the bitmap data of each page converted by the rasterization processing at a correct position according to a print setting.

The halftone processing is processing of converting print image data in a bitmap format expressed in multiple gradations into the number of gradations that can be output by the printing apparatus 300.

The separation processing is processing of dividing the print image data into separation data that is data for each color of ink.

Hereinafter, the analysis processing and the rasterization processing are collectively referred to as rendering processing. The rendering processing corresponds to first processing. Further, the imposition processing, the halftone processing, and the separation processing are collectively referred to as halftone processing. The halftone processing corresponds to second processing.

When the printing apparatus 300 receives the print image data obtained by the rendering processing and halftone processing of the processing apparatus 200, the printing apparatus 300 prints an image based on the print image data on a print medium.

2. Configuration of Information Processing Apparatus

Next, a hardware configuration of the information processing apparatus 100 will be described.

The information processing apparatus 100 includes a first communication interface 110, a first input and output interface 130, a touch panel 135, and a first control unit 150. Hereinafter, an interface is abbreviated as an I/F.

The first communication I/F 110, the first input and output I/F 130, and the first control unit 150 are coupled to one another via a bus 105 to allow data communication therebetween.

The first communication I/F 110 includes a connector and an interface circuit and is coupled to the network 10 in a wired manner. The first communication I/F 110 includes, for example, a network interface card (NIC) as the interface circuit.

The first input and output I/F 130 includes a connector and an interface circuit and is coupled to the touch panel 135. The first input and output I/F 130 is, for example, a USB interface compatible with a universal serial bus (USB) standard.

The touch panel 135 includes a display panel such as a liquid crystal panel or an organic electro luminescence (EL) panel, and a touch sensor. Illustration of the display panel and the touch sensor is omitted. The touch panel 135 corresponds to a display unit and an operation unit.

When the touch panel 135 detects a touch operation of a user on the display panel, the touch panel 135 outputs information indicating a position of the detected touch operation to the first control unit 150. A coordinate system is set in advance on the display panel, and when the touch panel 135 detects the touch operation, the touch panel 135 outputs coordinates indicating the position of the touch operation in the coordinate system to the first control unit 150 as information indicating a position.

The first control unit 150 is a computer device including a first storage unit 160 and a first processor 170.

The first storage unit 160 includes a volatile storage device and a non-volatile storage device.

The volatile storage device is implemented by, for example, a random access memory (RAM). The non-volatile storage device is implemented by, for example, a read only memory (ROM), a flash memory, or an electrically erasable programmable read-only memory (EEPROM).

The volatile storage device is used as a calculation area of the first processor 170.

The non-volatile storage device stores a control program including an application program 163. Hereinafter, the application program 163 will be referred to as an APP 163.

The first storage unit 160 includes a shared folder shared with the processing apparatus 200 and the printing apparatus 300 coupled to the network 10. The shared folder is a folder or a directory of the information processing apparatus 100 set to be accessible from the processing apparatus 200 and the printing apparatus 300 coupled to the same network 10.

The shared folder of the first storage unit 160 is provided for each processing apparatus 200 coupled to the network 10 and for each process executed by the processing apparatus 200. The process executed by the processing apparatus 200 includes the rendering processing and the halftone processing.

For example, in the first storage unit 160, a shared folder which the rendering processing monitors and a shared folder which the halftone processing monitors are provided as a shared folder with the processing apparatus 200A. The shared folder which the rendering processing monitors is a shared folder monitored by a second processor 250 of the processing apparatus 200A that executes a process of the rendering processing. Similarly, the shared folder which the halftone processing monitors is a shared folder monitored by the second processor 250 of the processing apparatus 200A that executes a process of the halftone processing.

In the first storage unit 160, a shared folder which the rendering processing monitors and a shared folder which the halftone processing monitors are provided as a shared folder with the processing apparatus 200B. Similarly, in the first storage unit 160, a shared folder which the rendering processing monitors and a shared folder which the halftone processing monitors are provided as a shared folder with the processing apparatus 200C. The details of the shared folders which the rendering processing monitors and the shared folders which the halftone processing monitors with the processing apparatuses 200B and 200C are the same as those of the shared folder with the processing apparatus 200A.

The first processor 170 is a calculation processing device including a processor such as a central processing unit (CPU) or a micro-processing unit (MPU). The first processor 170 may be implemented by a single processor or a plurality of processors. The first processor 170 may be implemented by a part or all of the first storage unit 160 and a system-on-a-chip (SoC) integrated with the other circuits. The first processor 170 may be implemented by a combination of a CPU that executes a program and a digital signal processor (DSP) that executes predetermined calculation processing. Further, the first processor 170 may be implemented by mounting all functions of the first processor 170 on hardware, or may be implemented by using a programmable device.

3. Configuration of Processing Apparatus

Next, a configuration of the processing apparatus 200A will be described. Since the processing apparatuses 200A to 200C have substantially the same configuration, the configuration of the processing apparatus 200A will be described here, and description of configurations of the processing apparatuses 200B and 200C will be omitted.

The processing apparatus 200A is configured such that a second communication I/F 210 and a second control unit 230 are coupled to each other via a bus 205 to allow data communication therebetween.

The second communication I/F 210 includes a connector and an interface circuit and is coupled to the network 10 in a wired manner. The second communication I/F 210 includes, for example, an NIC as the interface circuit.

The second control unit 230 is a computer device including a second storage unit 240 and the second processor 250.

The second storage unit 240 includes a volatile storage device and a non-volatile storage device. A configuration of the second storage unit 240 is the same as that of the first storage unit 160, and therefore detailed description thereof will be omitted.

The second storage unit 240 includes a shared folder shared with the information processing apparatus 100, other processing apparatuses 200B and 200C, and the printing apparatus 300 coupled to the network 10.

The shared folder is provided for each printing apparatus 300 coupled to the network 10 and for each process executed by the printing apparatus 300. The process executed by the printing apparatus 300 includes the printing processing to be described later.

For example, the second storage unit 240 is provided with a shared folder which the printing processing monitors as a shared folder with the printing apparatus 300A. The second storage unit 240 is provided with a shared folder which the printing processing monitors as a shared folder with the printing apparatus 300B. In addition, the second storage unit 240 is provided with a shared folder which the printing processing monitors as a shared folder with the printing apparatus 300C. The shared folder which the printing processing monitors is a shared folder monitored by a third processor 350 of each of the printing apparatuses 300A, 300B, and 300C which execute a process of the printing processing.

The second processor 250 is a calculation processing device including a processor such as a CPU and an MPU. The second processor 250 may be implemented by a single processor or a plurality of processors.

4. Configuration of Printing Apparatus

Next, a configuration of the printing apparatus 300 will be described.

The printing apparatus 300 includes a third communication I/F 310, a third control unit 330, and a printing unit 360.

The third communication I/F 310 includes a connector and an interface circuit and is coupled to the network 10 in a wired manner. The third communication I/F 310 includes, for example, an NIC as the interface circuit.

The third control unit 330 is a computer device including a third storage unit 340 and the third processor 350.

The third storage unit 340 includes a volatile storage device and a non-volatile storage device. A configuration of the third storage unit 340 is the same as that of the first storage unit 160, and therefore detailed description thereof will be omitted.

The third processor 350 is a calculation processing device including a processor such as a CPU and an MPU. The third processor 350 may be implemented by a single processor or a plurality of processors.

The printing unit 360 includes, for example, an ink cartridge that stores ink and a head that discharges the ink supplied from the ink cartridge to a sheet. Illustration of the ink cartridge and the head is omitted. The printing unit 360 prints an image on the sheet by an ink-jet method under control of the third control unit 330. The printing unit 360 is not limited to a configuration in which printing is performed by the ink-jet method, and may be a configuration in which the printing is performed by an electrophotographic method.

5. Operations of Information Processing Apparatus

Figure 2:
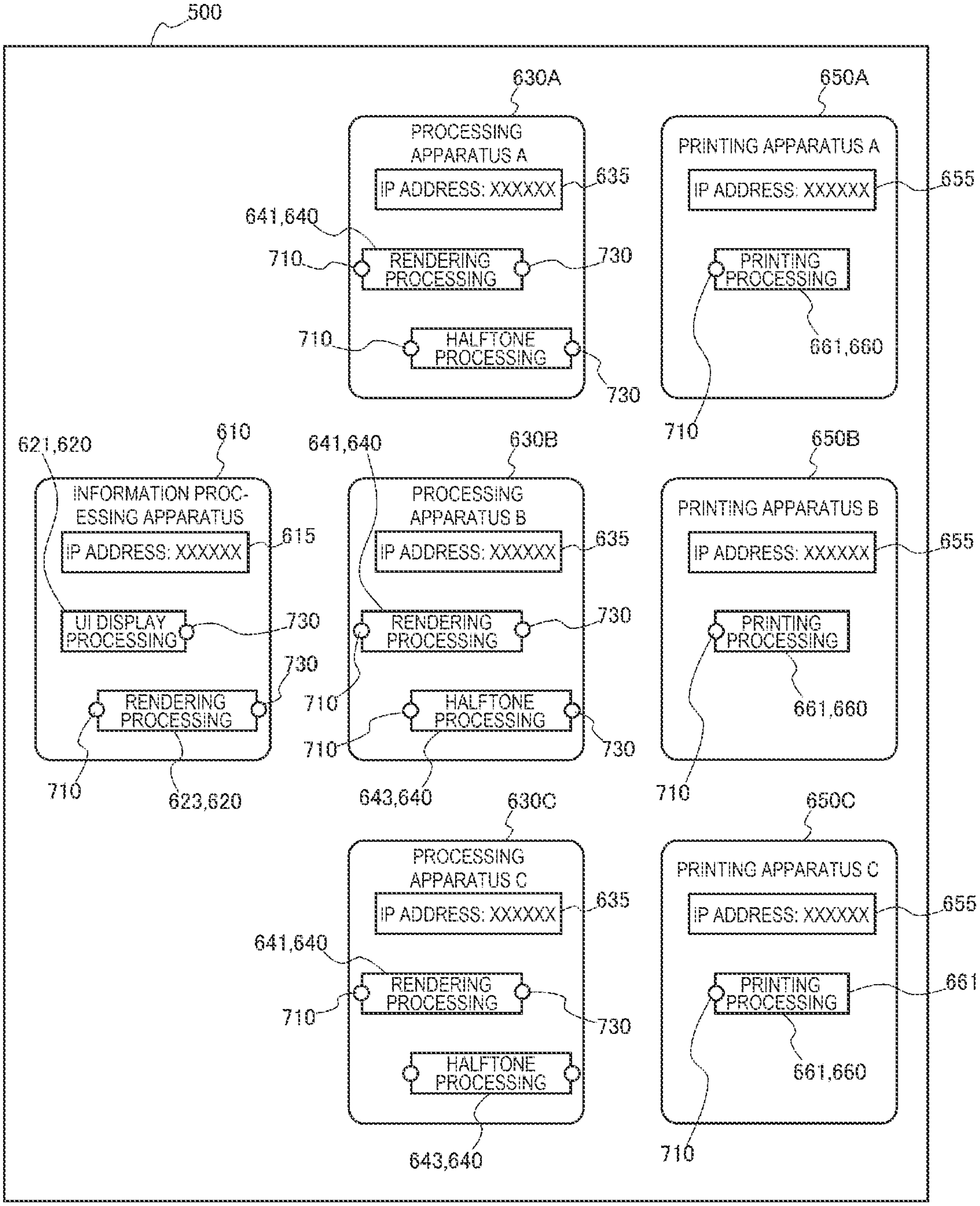
FIG. 2 is a diagram illustrating an example of an APP screen.

FIG. 2 is a diagram illustrating an example of an APP screen 500 displayed on a display unit 131 of the information processing apparatus 100.

When the APP 163 is selected by the touch operation, the first control unit 150 executes the selected APP 163 to display the APP screen 500 illustrated in FIG. 2 on the touch panel 135.

The first control unit 150 that executes the APP 163 is coupled to the network 10 and detects the processing apparatus 200 and the printing apparatus 300 capable of data communication with the information processing apparatus 100.

Next, the first control unit 150 acquires specification information and an IP address of the processing apparatus 200 from the detected processing apparatus 200, and acquires recommended specification information and an IP address of the printing apparatus 300 from the printing apparatus 300. The specification information corresponds to a processing capability, and the recommended specification information corresponds to a request processing capability.

The specification information acquired from the processing apparatus 200 includes a CPU performance, capacities of the RAM and a storage, and a network performance. The CPU performance includes, for example, information such as the number of cores, the number of threads, and a clock frequency. The network performance is information on a communication performance via the network 10 and is evaluated based on, for example, a numerical value measured by using a PING command.

The recommended specification information acquired from the printing apparatus 300 also includes a CPU performance, a capacity of the RAM and a storage, and a network performance. The recommended specification information is information stored in the third storage unit 340 of the printing apparatus 300 by a vendor that provides the printing apparatus 300 at a time of manufacturing the printing apparatus 300. The recommended specification information is information indicating a specification required for the processing apparatus 200. More specifically, the recommended specification information is information indicating the specification of the processing apparatus 200 capable of executing the printing processing by the printing apparatus 300 without reducing a processing speed of the printing processing.

Then, the first control unit 150 displays objects indicating the information processing apparatus 100, the detected processing apparatus 200, and the detected printing apparatus 300 on the APP screen 500.

In the embodiment, the objects are images obtained by symbolizing the information processing apparatus 100, the processing apparatus 200, and the printing apparatus 300.

The object corresponding to the information processing apparatus 100 is referred to as a first apparatus object 610. The object corresponding to the processing apparatus 200 is referred to as a second apparatus object 630. The object corresponding to the printing apparatus 300 is referred to as a third apparatus object 650.

The first apparatus object 610 displays an IP address 615 of the information processing apparatus 100 and a processing box 620 indicating processing that can be selected in the information processing apparatus 100.

The processing box 620 includes a name of the processing executable in the information processing apparatus 100 and a rectangular figure surrounding periphery of the name of the processing. The processing box 620 displayed in the first apparatus object 610 includes a user interface (UI) display processing box 621 and a rendering processing box 623.

In the UI display processing box 621, "UI display processing" is displayed as the name of the processing. The UI display processing is processing of displaying the APP screen 500 on the touch panel 135 of the information processing apparatus 100 and receiving an operation from the user.

In the rendering processing box 623, "rendering processing" is displayed as the name of the processing.

As seen in the drawing, operators are displayed on a right side of the UI display processing box 621 and on both left and right sides of the rendering processing box 623.

The operator displayed on the left side of the rendering processing box 623 is referred to as a front operator 710, and operators displayed on the right sides of the UI display processing box 621 and the rendering processing box 623 are referred to as rear operators 730.

The second apparatus object 630 includes a second apparatus object 630A corresponding to the processing apparatus 200A, a second apparatus object 630B corresponding to the processing apparatus 200B, and a second apparatus object 630C corresponding to the processing apparatus 200C.

Each second apparatus object 630 displays an IP address 635 of the corresponding processing apparatus 200 and a processing box 640 indicating processing that can be selected in the processing apparatus 200.

The processing box 640 includes a name of processing executable in the processing apparatus 200 and a rectangular figure surrounding periphery of the name of the processing. The processing box 640 displayed in the second apparatus object 630B includes a rendering processing box 641 and a halftone processing box 643.

In the rendering processing box 641, "rendering processing" is displayed as the name of the processing. The rendering processing box 641 corresponds to a first processing object.

In the halftone processing box 643, "halftone processing" is displayed as the name of the processing. The halftone processing box 643 corresponds to a second processing object.

As seen in the drawing, the front operators 710 are displayed on left sides of the rendering processing box 641 and the halftone processing box 643, and the rear operators 730 are displayed on right sides of the rendering processing box 641 and the halftone processing box 643.

The third apparatus object 650 includes a third apparatus object 650A corresponding to the printing apparatus 300A, a third apparatus object 650B corresponding to the printing apparatus 300B, and a third apparatus object 650C corresponding to the printing apparatus 300C.

Each third apparatus object 650 displays an IP address 655 of the corresponding printing apparatus 300 and a processing box 660 indicating processing that can be selected in the printing apparatus 300.

The processing box 660 includes a name of processing executable in the printing apparatus 300 and a rectangular figure surrounding periphery of the name of the processing.

The processing box 660 displayed in the third apparatus object 650 includes a printing processing box 661.

In the printing processing box 661, "printing processing" is displayed as the name of the processing.

As seen in the drawing, the front operator 710 is displayed on a left side of the printing processing box 661.

Figure 3:
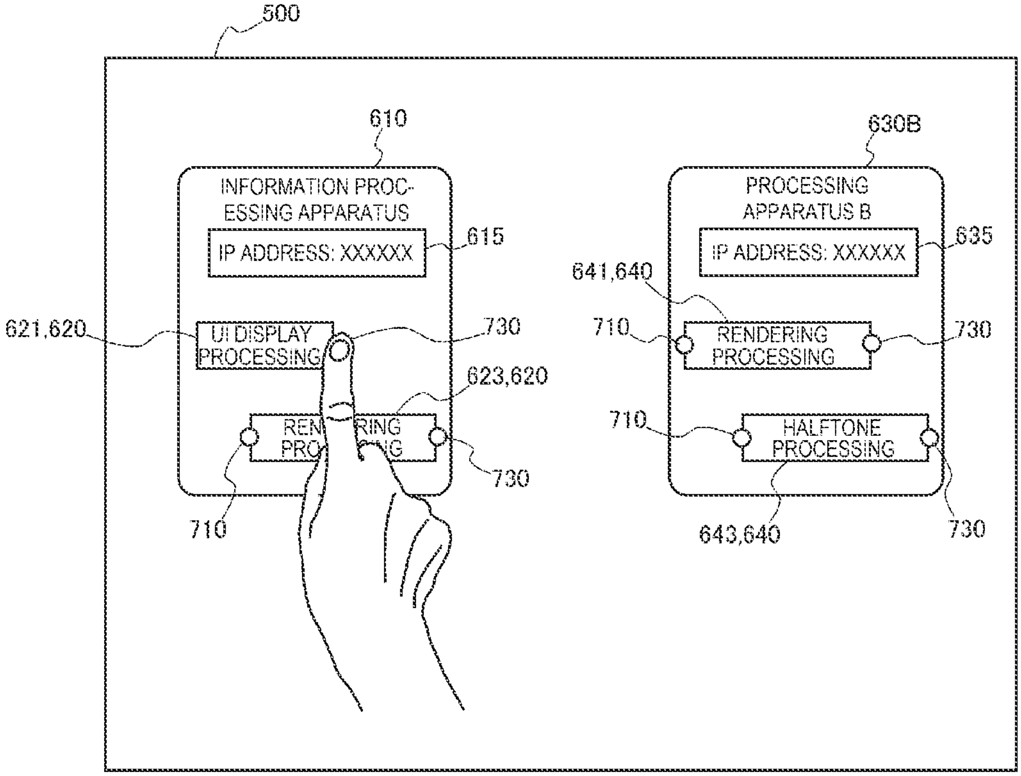
FIG. 3 is a diagram illustrating an example of the APP screen.
Figure 4:
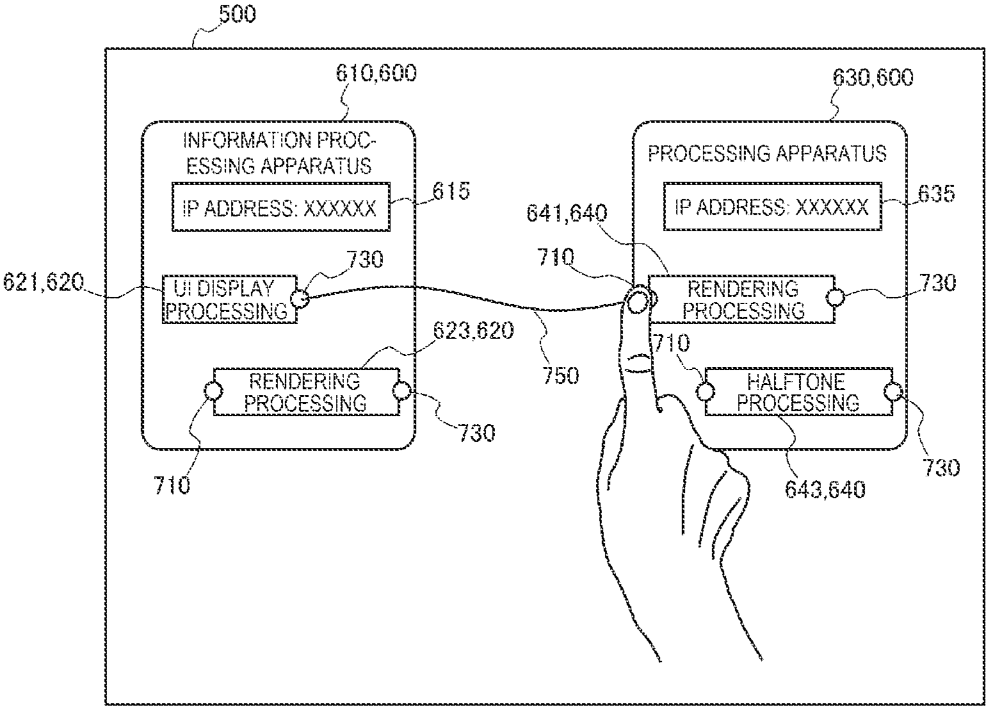
FIG. 4 is a diagram illustrating an example of the APP screen.

FIGS. 3 and 4 are diagrams illustrating examples of the APP screen 500. In particular, FIGS. 3 and 4 are explanatory diagrams illustrating an operation of selecting, on the APP screen 500, the processing apparatus 200 caused to execute the rendering processing. FIG. 3 illustrates a state in which the user touches the rear operator 730 of the UI display processing box 621 with a finger thereof. FIG. 4 illustrates a state in which the user's finger touching the rear operator 730 is moved to the front operator 710 of the rendering processing box 641. Due to space constraints, FIGS. 3 and 4 illustrate, in an enlarged manner, a part of the APP screen 500 on which the first apparatus object 610 and the second apparatus object 630B are displayed.

For example, it is assumed that the processing apparatus 200B is selected as the processing apparatus 200 in charge of the rendering processing.

The user touches the rear operator 730 of the UI display processing box 621 with the finger, and moves the finger touching the rear operator 730 to the front operator 710 of the rendering processing box 641 while keeping the finger in contact with the touch panel 135.

The first control unit 150 displays a coupling line 750 on the touch panel 135 when the front operator 710 or the rear operator 730 which is not coupled to another operator is selected by the touch operation. The coupling line 750 corresponds to a line segment.

The first control unit 150 extends the displayed coupling line 750 to follow the movement of the user's finger moving on the touch panel 135.

The user moves the finger to the front operator 710, and releases the moved finger from the touch panel 135 at a position of the front operator 710. In this case, the first control unit 150 couples the rear operator 730 of the UI display processing box 621 and the front operator 710 of the rendering processing box 641 by the coupling line 750. This operation corresponds to an operation of associating the UI display processing box 621 with the rendering processing box 641.

As in a case of associating the UI display processing box 621 with the rendering processing box 641, the user associates the rendering processing box 641 with the halftone processing box 643. The halftone processing box 643 associated with the rendering processing box 641 may be the halftone processing box 643 included in the same second apparatus object 630. Further, the halftone processing box 643 associated with the rendering processing box 641 may be the halftone processing box 643 included in another second apparatus object 630.

Figure 5:
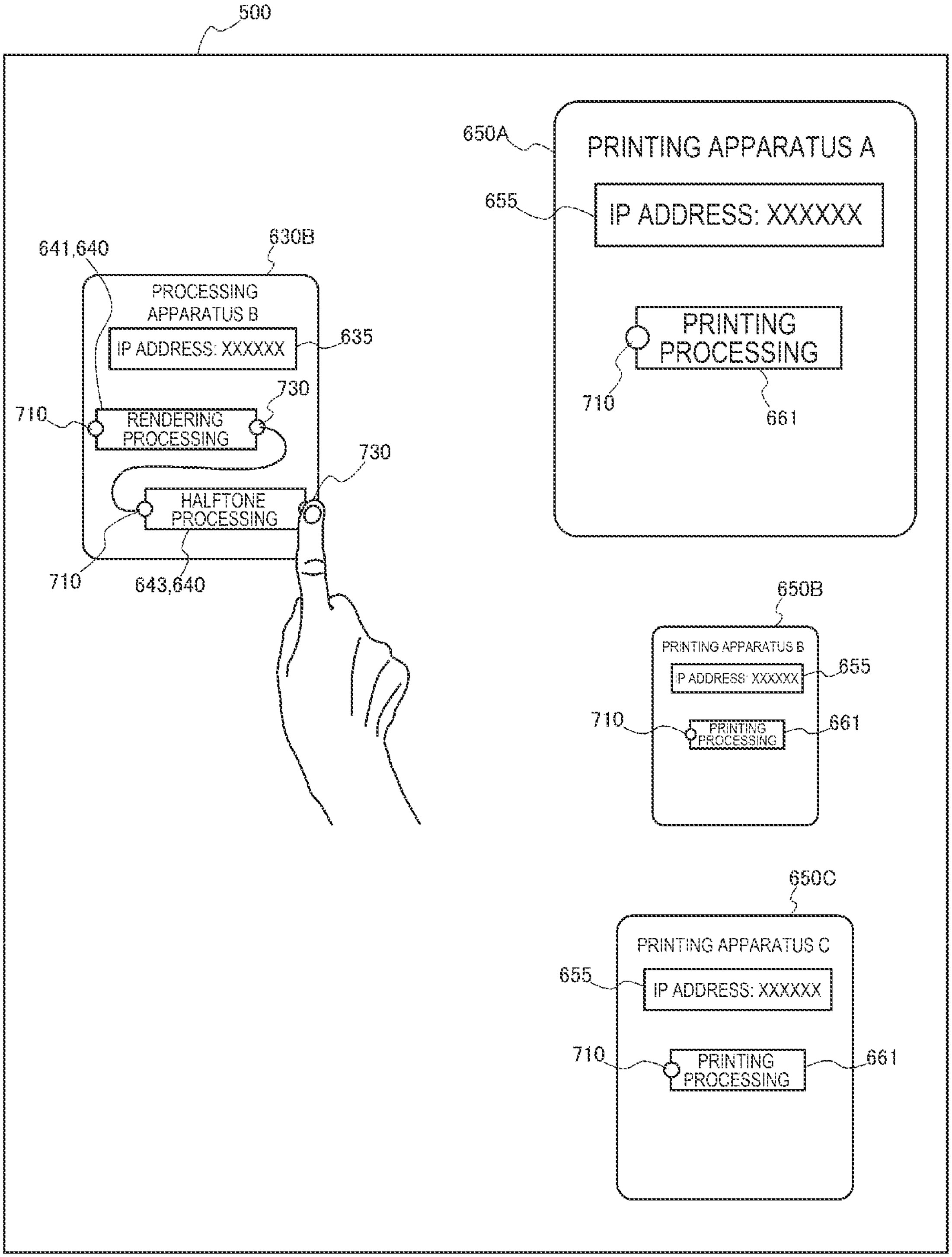
FIG. 5 is a diagram illustrating an example of the APP screen.
Figure 6:
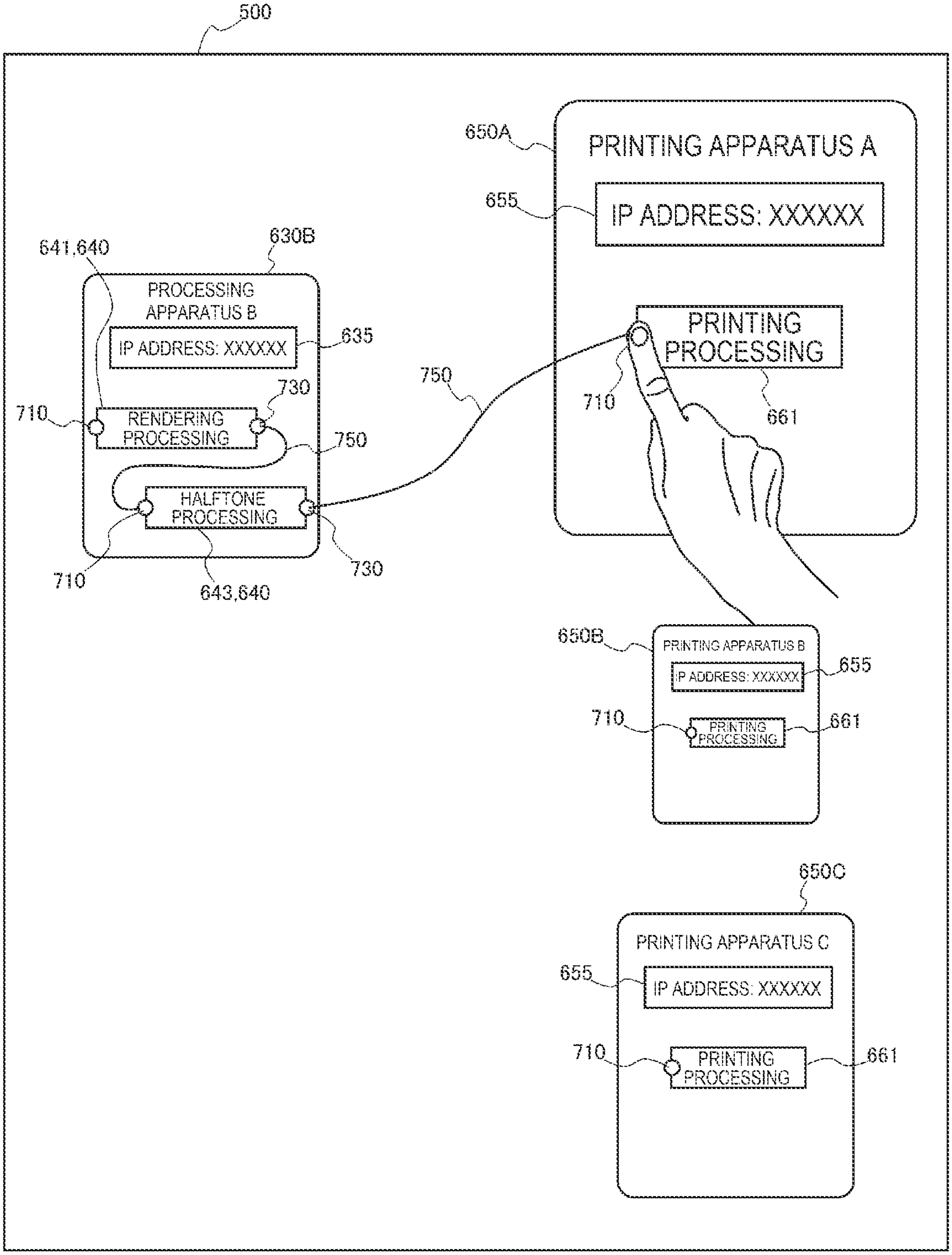
FIG. 6 is a diagram illustrating an example of the APP screen.

FIGS. 5 and 6 are diagrams illustrating examples of the APP screen 500. In particular, FIGS. 5 and 6 are explanatory diagrams illustrating an operation of selecting, on the APP screen 500, the printing apparatus 300 caused to execute the printing processing.

FIG. 5 illustrates a state in which the user touches the rear operator 730 of the halftone processing box 643 with the finger. FIG. 6 illustrates a state in which the user's finger is moved to the front operator 710 of the printing processing box 661. Due to space constraints, FIGS. 5 and 6 illustrate, in an enlarged manner, a part of the APP screen 500 on which the second apparatus object 630B and the third apparatus object 650 are displayed.

FIGS. 5 and 6 illustrate a state in which the processing apparatus 200B is selected as an apparatus in charge of the halftone processing, and the rendering processing box 641 and the halftone processing box 643 of the second apparatus object 630B are coupled by the coupling line 750.

When a position of the rear operator 730 of the halftone processing box 643 is detected as an operation position of the touch operation, the first control unit 150 changes display sizes of the third apparatus objects 650A, 650B, and 650C.

The first control unit 150 compares specification information acquired from the processing apparatus 200B with recommended specification information acquired from the printing apparatuses 300A to 300C, and changes a display size of the third apparatus object 650 based on a comparison result.

For example, the first control unit 150 changes the display size of the third apparatus object 650 in five levels in an order of a first display size, a second display size, a third display size, a fourth display size, and a fifth display size. The first display size is the largest among the five display sizes, and the fifth display size is the smallest among the five display sizes.

When all of four items including the performance of the CPU, the capacities of the RAM and the storage, and the network performance satisfy recommended specifications, the first control unit 150 displays the third apparatus object 650 in the first display size. When three of the four items including the performance of the CPU, the capacities of the RAM and the storage, and the network performance satisfy the recommended specifications, the first control unit 150 displays the third apparatus object 650 in the second display size. The second display size is smaller than the first display size. Similarly, the first control unit 150 changes the display size of the third apparatus object 650, and when all of the four items do not satisfy the recommended specifications, the first control unit 150 displays the third apparatus object 650 in the fifth display size. The display size of the third apparatus object 650 is not limited to five levels, and may be two levels or three levels.

When the display size of the third apparatus object 650 is changed, the user selects, based on the changed display size of the third apparatus object 650, the printing apparatus 300 caused to execute the printing processing. At this time, the optimum printing apparatus 300 can be selected by selecting the third apparatus object 650 having the largest display size.

It is assumed that the printing apparatus 300A is selected as the printing apparatus 300 in charge of the printing processing. The user touches the rear operator 730 of the halftone processing box 643 with the finger, and moves the finger touching the rear operator 730 to a position of the front operator 710 of the third apparatus object 650A corresponding to the printing apparatus 300A while keeping the finger in contact with the touch panel 135.

The first control unit 150 displays the coupling line 750 on the touch panel 135 when the front operator 710 or the rear operator 730 which is not coupled to another operator is selected by the touch operation.

The first control unit 150 extends the displayed coupling line 750 to follow the movement of the user's finger moving on the touch panel 135.

The user moves the finger to the front operator 710, and releases the moved finger from the touch panel 135 at the position of the front operator 710. In this case, the first control unit 150 couples the rear operator 730 of the halftone processing box 643 and the front operator 710 of the printing processing box 661 by the coupling line 750. This operation corresponds to an operation of associating the rendering processing box 641 with the halftone processing box 643.

In the description of FIGS. 5 and 6, the coupling line 750 is coupled to the third apparatus object 650 from the second apparatus object 630. In contrast to the description of FIGS. 5 and 6, the coupling line 750 may be coupled to the rear operator 730 displayed on the second apparatus object 630 from the front operator 710 displayed on the third apparatus object 650.

FIG. 6 illustrates the third apparatus object 650A corresponding to the printing apparatus 300A, the third apparatus object 650B corresponding to the printing apparatus 300B, and the third apparatus object 650C corresponding to the printing apparatus 300C. However, only the third apparatus object 650 corresponding to the printing apparatuses 300A, 300B, and 300C that can be used by the selected processing apparatus 200 among the third apparatus objects 650A to 650C may be displayed.

For example, the third apparatus objects 650A to 650C corresponding to the printing apparatus 300 whose power is turned off among the printing apparatuses 300 are not displayed on the APP screen 500.

It is assumed that the processing apparatus 200B is selected as the processing apparatus 200 that performs the rendering processing and the halftone processing. In this case, the first control unit 150 may compare the specification information acquired from the processing apparatus 200B with the recommended specification information acquired from the printing apparatuses 300A to 300C, and may delete the third apparatus object 650 that does not satisfy recommended specifications of the printing apparatuses 300A to 300C. That is, only the third apparatus object 650 of the printing apparatus 300 that can be used by the processing apparatus 200B is displayed.

For example, the first control unit 150 may not display the third apparatus object 650 whose display size is determined to be the fifth display size on the APP screen 500, or may not display the third apparatus object 650 having the third display size or less on the APP screen 500.

Figure 7:
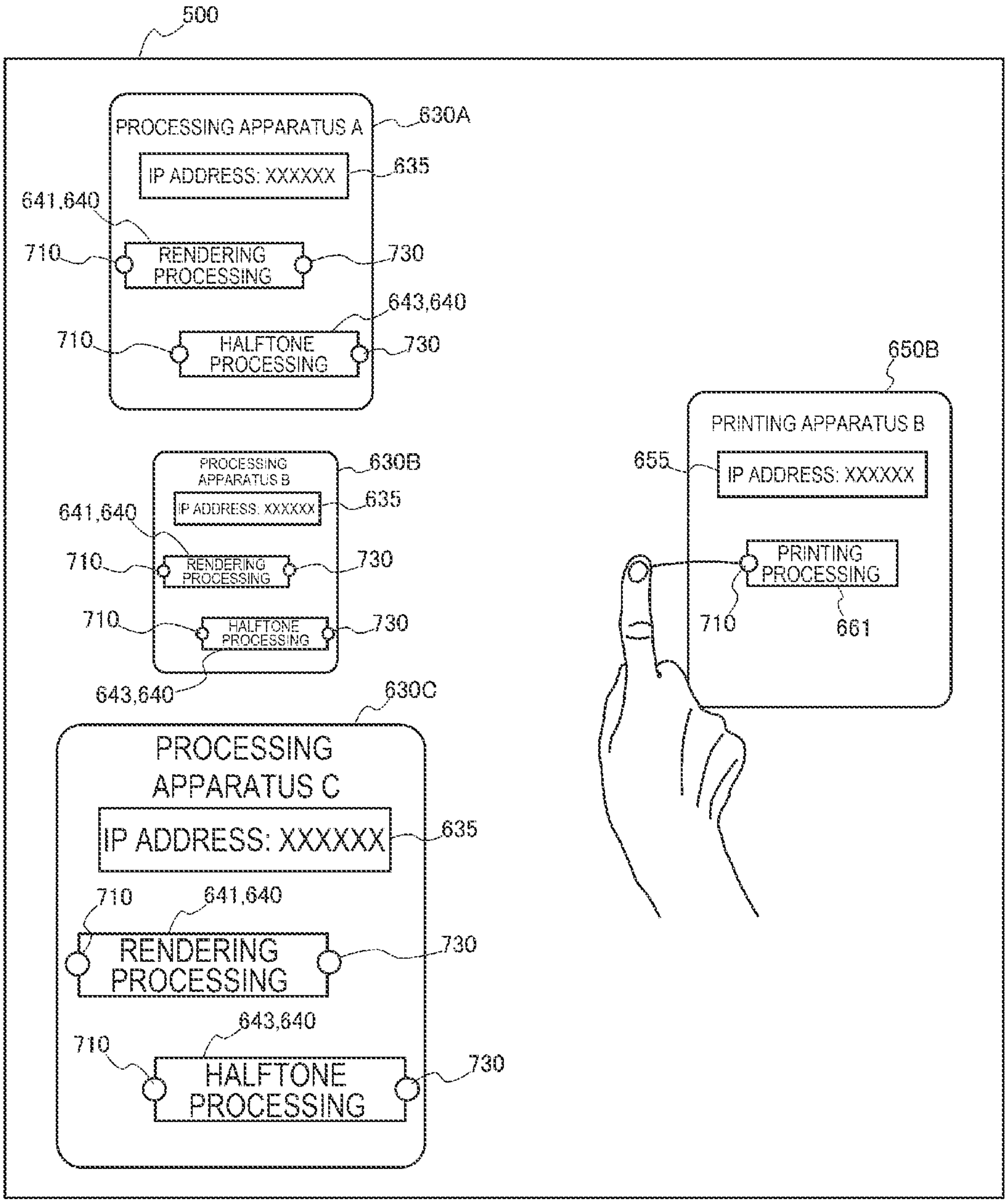
FIG. 7 is a diagram illustrating an example of the APP screen.

FIG. 7 is a diagram illustrating an example of the APP screen 500. In particular, FIG. 7 illustrates a state in which the user's finger touching the front operator 710 of the printing processing box 661 is moved toward a direction of the processing apparatus 200. Due to space constraints, FIG. 7 illustrates, in an enlarged manner, a part of the APP screen 500 on which the second apparatus objects 630A to 630C and the third apparatus object 650B are displayed.

When the position of the front operator 710 of the printing processing box 661 is detected as the operation position of the touch operation, the first control unit 150 changes the display sizes of the second apparatus objects 630A, 630B, and 630C.

The first control unit 150 compares the specification information acquired from the processing apparatus 200B with the recommended specification information acquired from the printing apparatuses 300A to 300C, and changes the display size of the second apparatus object 630 based on the comparison result. The method of changing the display size of the second apparatus object 630 is the same as that of the third apparatus object 650.

When the display size of the second apparatus object 630 is changed, the user selects, based on the changed display size of the second apparatus object 630, the processing apparatus 200 caused to execute the halftone processing. At this time, as illustrated in FIG. 7, the optimum processing apparatus 200 can be selected by selecting the third apparatus object 650C having the largest display size.

The first control unit 150 generates the control information when an apparatus caused to execute UI processing, the rendering processing, the halftone processing, and the printing processing is selected and a confirmation button (not illustrated) is pressed.

The control information is information for causing the processing apparatus 200 corresponding to the second apparatus object 630 selected by an operation of the APP screen 500 to execute the rendering processing and the halftone processing or the halftone processing. In addition, the control information is information for causing the printing apparatus 300 corresponding to the third apparatus object 650 selected by the operation of the APP screen 500 to execute the printing processing. The control information is described in a predetermined language. For example, job definition format (JDF) is used in the predetermined language.

The control information includes an IP address of the processing apparatus 200 caused to execute the rendering processing and a folder path indicating a location of the shared folder which the rendering processing monitors.

The control information includes an IP address of the processing apparatus 200 caused to execute the halftone processing and a folder path indicating a location of the shared folder which the halftone processing monitors.

The control information further includes an IP address of the printing apparatus 300 caused to execute the printing processing, a folder path indicating a location of the shared folder which the printing processing monitors, and a print port or a driver queue name.

Figure 8:
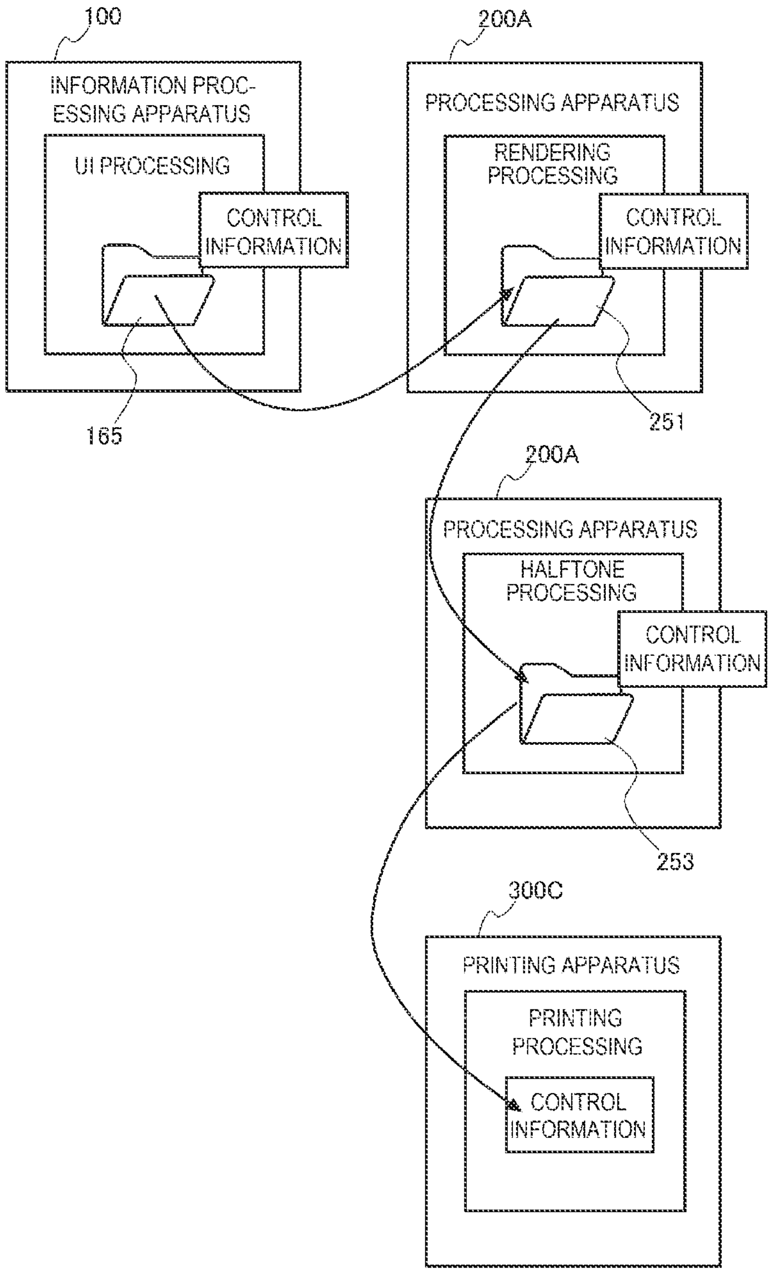
FIG. 8 is a conceptual diagram illustrating how control information is transferred.

FIG. 8 is a conceptual diagram illustrating how the control information is transferred.

An operation in which the processing apparatus 200 and the printing apparatus 300 execute processing according to the control information will be described with reference to FIG. 8. FIG. 8 illustrates a flow of the control information when the processing apparatus 200A is selected as the processing apparatus 200 in charge of the rendering processing and the halftone processing and the printing apparatus 300C is selected as the printing apparatus 300 in charge of the printing processing. It is assumed that the shared folder monitored by the second control unit 230 that executes the rendering processing and is provided in the processing apparatus 200A is a shared folder 165 of the information processing apparatus 100. It is assumed that the shared folder monitored by the second control unit 230 that executes the halftone processing and is provided in the processing apparatus 200A is a shared folder 251 of the processing apparatus 200A. Further, it is assumed that the shared folder monitored by the third control unit 330 that executes the printing processing and is provided in the printing apparatus 300C is a shared folder 253 of the processing apparatus 200A.

When generating the control information, the first control unit 150 stores the generated control information and the PDL data in the shared folder 165. The shared folder 165 is a folder monitored by the second control unit 230 of the processing apparatus 200A that executes the rendering processing.

The second control unit 230 of the processing apparatus 200A that monitors the shared folder 165 acquires the control information and the PDL data from the shared folder 165. The second control unit 230 of the processing apparatus 200A executes the rendering processing on the acquired PDL data. Thereafter, the second control unit 230 of the processing apparatus 200A refers to the control information and stores the control information and the data subjected to the rendering processing in the shared folder 251. The shared folder 251 is a folder monitored by the second control unit 230 of the processing apparatus 200A that executes the halftone processing.

The second control unit 230 of the processing apparatus 200A that monitors the shared folder 251 acquires the control information and the data subjected to the rendering processing from the shared folder 251.

The second control unit 230 of the processing apparatus 200A executes the halftone processing on the acquired processed data subjected to the rendering processing. Thereafter, the second control unit 230 of the processing apparatus 200A refers to the control information and stores the control information and the print image data subjected to the halftone processing in the shared folder 253. The shared folder 253 is a folder monitored by the third control unit 330 of the printing apparatus 300C that executes the printing processing.

The third control unit 330 of the printing apparatus 300C that monitors the shared folder 253 acquires the control information and the print image data from the shared folder 253. The third control unit 330 of the printing apparatus 300C prints the image based on the acquired print image data on the print medium.

Figure 9:
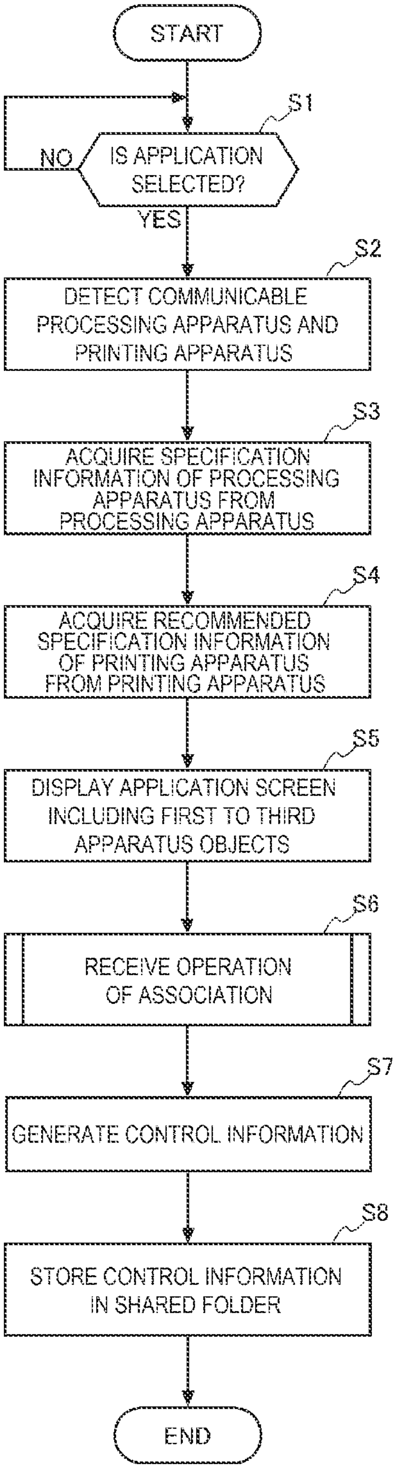
FIG. 9 is a flowchart illustrating operations of an information processing apparatus.
Figure 10:
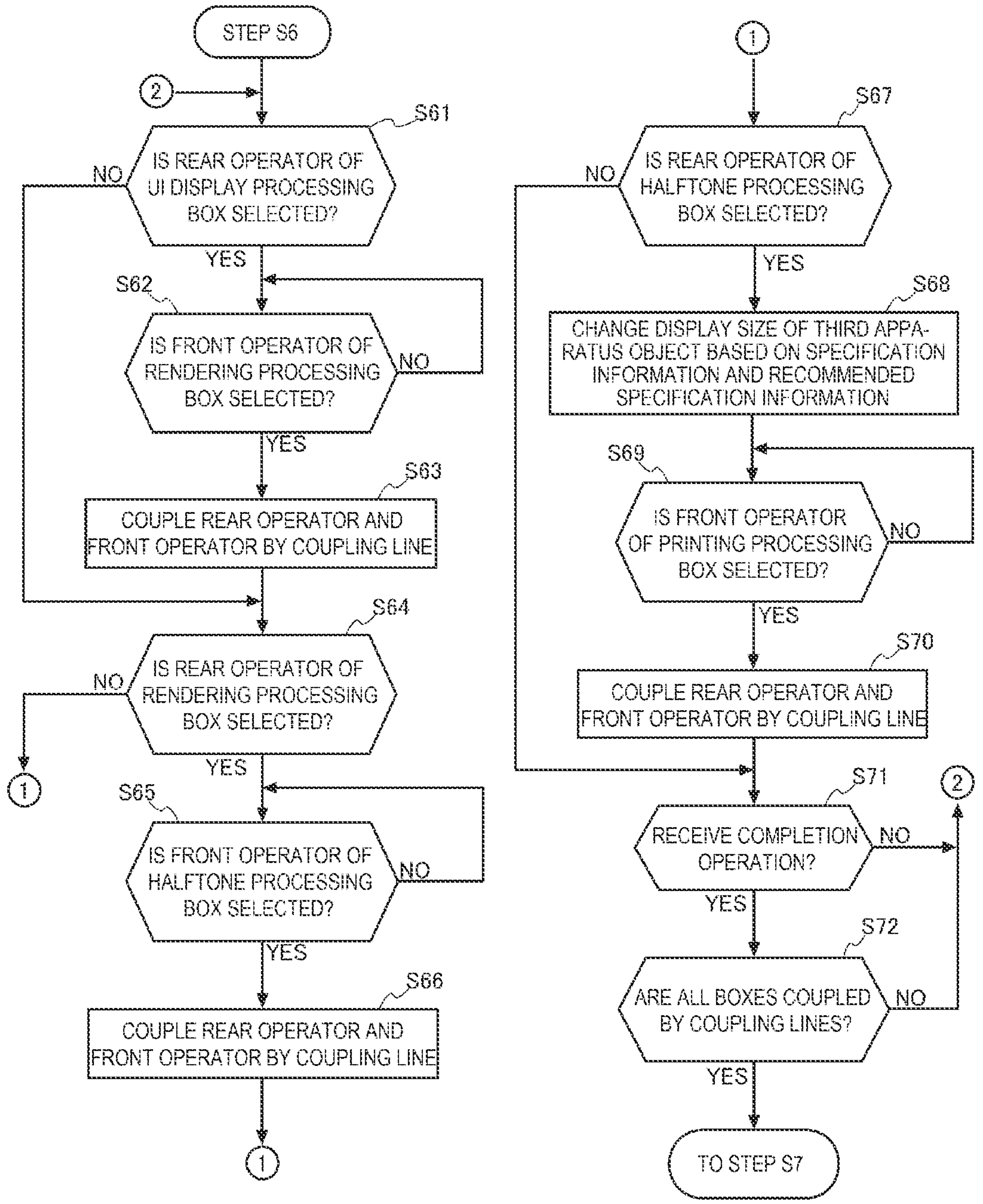
FIG. 10 is a flowchart illustrating operations of the information processing apparatus.

FIGS. 9 and 10 are flowcharts illustrating operations of the information processing apparatus 100.

The operations of the information processing apparatus 100 will be described with reference to the flowcharts illustrated in FIGS. 9 and 10.

The first control unit 150 determines whether the APP 163 is selected (step S1). When the APP 163 is not selected (NO in step S1), the first control unit 150 waits until the APP 163 is selected.

When the APP 163 is selected (YES in step S1), the first control unit 150 executes the selected APP 163 to detect the processing apparatus 200 and the printing apparatus 300 communicable via the network 10 (step S2). Then, the first control unit 150 acquires the specification information of the processing apparatus 200 from the detected communicable processing apparatus 200 (step S3). Then, the first control unit 150 acquires the recommended specification information of the printing apparatus 300 from the detected communicable printing apparatus 300 (step S4).

Next, the first control unit 150 displays the APP screen 500 on the touch panel 135 (step S5). The APP screen 500 displays the first apparatus object 610, the second apparatus object 630 corresponding to the communicable processing apparatus 200 detected in step S2, and the third apparatus object 650 corresponding to the communicable printing apparatus 300.

Next, the first control unit 150 receives the operations of associating the UI display processing box 621, the rendering processing box 641, the halftone processing box 643, and the printing processing box 661 (step S6). The user inputs the operations of associating the UI display processing box 621, the rendering processing box 641, the halftone processing box 643, and the printing processing box 661 by performing the touch operation on the touch panel 135.

When the UI display processing box 621, the rendering processing box 641, the halftone processing box 643, and the printing processing box 661 are associated with one another, the first control unit 150 generates the control information (step S7).

The control information includes information for instructing the execution of the rendering processing to the processing apparatus 200 corresponding to the second apparatus object 630 including the rendering processing box 641 selected in step S6. The control information includes information for instructing the execution of the halftone processing to the processing apparatus 200 corresponding to the second apparatus object 630 including the halftone processing box 643 selected in step S6. The control information further includes information for instructing the execution of the printing processing to the printing apparatus 300 of the third apparatus object 650 including the printing processing box 661 selected in step S6.

Next, the first control unit 150 stores the control information generated in step S7 in the shared folder (step S8). The shared folder is the shared folder monitored by the processing apparatus 200 that executes the rendering processing. When the control information is stored in the shared folder, the processing apparatus 200 designated by the control information executes the rendering processing and the halftone processing, and the printing apparatus 300 designated by the control information executes the printing processing.

Next, step S6 illustrated in FIG. 9 will be described in detail with reference to the flowchart illustrated in FIG. 10. In a processing flow, only an operation method in a case of coupling the front operator 710 from the rear operator 730 is described to simplify the description, and an operation of coupling the rear operator 730 from the front operator 710 can also be performed.

First, the first control unit 150 determines whether the rear operator 730 of the UI display processing box 621 is selected by the touch operation (step S61). When the rear operator 730 of the UI display processing box 621 is not selected (NO in step S61), the first control unit 150 proceeds to determination in step S64.

When the rear operator 730 of the UI display processing box 621 is selected by the touch operation (YES in step S61), the first control unit 150 determines whether the front operator 710 of the rendering processing box 641 is selected by the touch operation (step S62).

When the front operator 710 of the rendering processing box 641 is not selected (NO in step S62), the first control unit 150 waits until the front operator 710 of the rendering processing box 641 is selected.

When the front operator 710 is selected (YES in step S62), the first control unit 150 couples the rear operator 730 of the UI display processing box 621 and the front operator 710 of the rendering processing box 641 by the coupling line 750 (step S63).

Next, the first control unit 150 determines whether the rear operator 730 of the rendering processing box 641 is selected by the touch operation (step S64). When the rear operator 730 of the rendering processing box 641 is not subjected to the touch operation (NO in step S64), the first control unit 150 proceeds to determination in step S67.

When the rear operator 730 of the rendering processing box 641 is subjected to the touch operation (YES in step S64), the first control unit 150 determines whether the front operator 710 of the halftone processing box 643 is selected (step S65). When the front operator 710 of the halftone processing box 643 is not selected (NO in step S65), the first control unit 150 waits until the front operator 710 of the halftone processing box 643 is selected.

When the front operator 710 is selected (YES in step S65), the first control unit 150 couples the rear operator 730 of the rendering processing box 641 and the front operator 710 of the halftone processing box 643 by the coupling line 750 (step S66).

Next, the first control unit 150 determines whether the rear operator 730 of the halftone processing box 643 is selected by the touch operation (step S67). When the rear operator 730 of the halftone processing box 643 is not subjected to the touch operation (NO in step S67), the first control unit 150 proceeds to determination in step S71.

When the rear operator 730 of the halftone processing box 643 is selected by the touch operation (YES in step S67), the first control unit 150 changes the display size of each third apparatus object 650 (step S68). The first control unit 150 changes the display size of each third apparatus object 650 based on the specification information acquired from the processing apparatus 200 in step S3 and the recommended specification information acquired from the printing apparatus 300 in step S4 (step S68).

For example, when specifications of the processing apparatus 200 indicated by the specification information satisfy all specifications requested by the recommended specification information, the first control unit 150 displays the third apparatus object 650 in the first display size.

In addition, the first control unit 150 changes the display size of the third apparatus object 650 to the second display size, the third display size, and the fourth display size according to a degree of the specifications of the processing apparatus 200 indicated by the specification information satisfying the specifications requested by the recommended specification information. The second display size is larger than the third display size, and the third display size is larger than the fourth display size.

When the specifications of the processing apparatus 200 indicated by the specification information do not satisfy all the specifications requested by the recommended specification information, the first control unit 150 displays the third apparatus object 650 in the fifth display size.

Next, the first control unit 150 determines whether the front operator 710 of the printing processing box 661 is selected (step S69). When the front operator 710 of the printing processing box 661 is not selected (NO in step S69), the first control unit 150 waits until the front operator 710 of the printing processing box 661 is selected.

When the front operator 710 is selected (YES in step S69), the first control unit 150 couples the rear operator 730 of the halftone processing box 643 and the front operator 710 of the printing processing box 661 by the coupling line 750 (step S70).

Next, the first control unit 150 determines whether a completion operation is received by the touch operation on the touch panel 135 (step S71). When the completion operation is not received (NO in step S71), the first control unit 150 returns to the determination in step S61.

When receiving the completion operation (YES in step S71), the first control unit 150 determines whether the UI display processing box 621, the rendering processing box 641, the halftone processing box 643, and the printing processing box 661 are coupled (step S72).

When the UI display processing box 621, the rendering processing box 641, the halftone processing box 643, and the printing processing box 661 are not coupled (NO in step S71), the first control unit 150 returns to the determination in step S61. When the UI display processing box 621, the rendering processing box 641, the halftone processing box 643, and the printing processing box 661 are coupled (YES in step S71), the first control unit 150 proceeds to the processing in step S7.

The above-described embodiment is a preferred embodiment of the present disclosure. However, the present disclosure is not limited to the above-described embodiment, and various modifications are possible without departing from the gist of the present disclosure.

For example, when acquiring the specification information from the processing apparatus 200, the first control unit 150 may acquire information indicating a processing status of the processing apparatus 200. Similarly, when acquiring the recommended specification information from the printing apparatus 300, the first control unit 150 also acquires information indicating a processing status of the printing apparatus 300. The first control unit 150 may change, based on the information indicating the processing status acquired from the processing apparatus 200, the processing apparatus 200 caused to execute the rendering processing or the halftone processing when a processing load of the processing apparatus 200 selected by the user is large. The first control unit 150 generates the control information for causing the selected processing apparatus 200 to execute at least one of the rendering processing and the halftone processing.

Similarly, the first control unit 150 may change, based on the information indicating the processing status acquired from the printing apparatus 300, the printing apparatus 300 caused to execute the printing processing when the processing load of the printing apparatus 300 selected by the user is large. The first control unit 150 generates the control information for causing the selected printing apparatus 300 to execute the printing processing.

In the above-described embodiment, the first control unit 150 changes the display size of the third apparatus object 650 in the five levels in the order of the first display size, the second display size, the third display size, the fourth display size, and the fifth display size.

In addition, a display color of the third apparatus object 650 may be changed or the third apparatus object 650 may be displayed in a blinking manner based on the specification information acquired from the processing apparatus 200 and the recommended specification information acquired from the printing apparatus 300 in step S4. When the third apparatus object 650 is displayed in a blinking manner, as the number of specifications of the processing apparatus 200 that satisfy the recommended specifications of the printing apparatus 300 increases, a blinking interval may be changed to be shorter.

In the above-described embodiment, the objects are associated by the operation of the user on the touch panel. The application screen may be displayed on a display such as a notebook PC, and the user may perform an operation of associating the objects by operating an input device such as a mouse.

Functional units of the information processing apparatus 100, the processing apparatus 200, and the printing apparatus 300 illustrated in FIG. 1 indicate functional configurations, and specific mounting forms are not particularly limited. That is, there is no need to mount hardware corresponding to each functional unit, and it is also possible to implement a configuration in which one or a plurality of processors execute programs to implement functions of a plurality of functional units. A part of the functions implemented by software in the above-described embodiment may be implemented by hardware, or a part of functions implemented by hardware may be implemented by software. In addition, specific detailed configurations of the other units of the information processing apparatus 100, the processing apparatus 200, and the printing apparatus 300 can be freely changed without departing from the gist of the present disclosure.

Processing units of the flowcharts illustrated in FIGS. 9 and 10 are divided according to main processing contents to facilitate understanding of the processing of the information processing apparatus 100. The present disclosure is not limited by a way of dividing the processing units and names illustrated in the flowcharts of FIGS. 9 and 10. Further, the processing of the information processing apparatus 100 may be divided into more processing units according to the processing contents, or one processing unit may be divided to include more processing. Further, a processing order of the flowcharts is not limited to the illustrated example.

When a control method of the information processing apparatus 100 is implemented by a computer included in the information processing apparatus 100, it is also possible to configure a program executed by the computer in an aspect of a recording medium or a transmission medium for transmitting the program. A magnetic or optical recording medium, or a semiconductor memory device may be used as the recording medium. Specific examples thereof include a fixed type recording medium or a removable recording medium such as a flexible disk, a hard disk drive (HDD), a CD-ROM, a DVD, a Blu-ray Disc, a magneto-optical disk, a flash memory, and a card type recording medium. Blu-ray is a registered trademark.

6. Summary of Present Disclosure

Hereinafter, the present disclosure will be summarized.

APPENDIX 1

A printing system including:

a plurality of processing apparatuses configured to execute raster image processor (RIP) processing on data to be printed;

one or a plurality of printing apparatuses configured to execute printing processing of printing an image based on the data to be printed on a print medium; and an instruction apparatus configured to receive an operation of designating the processing apparatus caused to execute the RIP processing and the printing apparatus caused to execute the printing processing, in which the instruction apparatus includes:

a display unit;

a control unit configured to display a display screen on the display unit, the display screen including a first apparatus object indicating the instruction apparatus, a plurality of second apparatus objects associated with the plurality of processing apparatuses, respectively, and a third apparatus object associated with the printing apparatus; and an operation unit configured to receive an operation of associating the first apparatus object with the second apparatus object and an operation of associating the second apparatus object with the third apparatus object, and the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

According to the configuration, by performing an operation of associating the objects displayed on the display screen with each other, it is possible to select the processing apparatus that executes the RIP processing and the printing apparatus that executes the printing processing, and it is possible to improve usability of a user.

APPENDIX 2

The printing system according to Appendix 1, in which the RIP processing includes first processing and second processing, the control unit displays the plurality of second apparatus objects including a first processing object indicating the first processing and a second processing object indicating the second processing on the display unit, the operation unit receives an operation of associating the first apparatus object with the first processing object, an operation of associating the first processing object with the second processing object, and an operation of associating the second processing object with the third apparatus object, and the control unit generates the control information for causing the processing apparatus corresponding to the second apparatus object including the first processing object associated with the first apparatus object to execute the first processing, causing the processing apparatus corresponding to the second apparatus object including the second processing object associated with the first processing object to execute the second processing, and causing the printing apparatus corresponding to the third apparatus object associated with the second processing object to execute the printing processing.

According to the configuration, by performing the operation of associating the objects displayed on the display screen, it is possible to select the processing apparatus that executes the first processing and the second processing included in the RIP processing and the printing apparatus that executes the printing processing, and it is possible to improve the usability of the user.

APPENDIX 3

The printing system according to Appendix 2, in which the control unit displays a line segment coupling the first apparatus object and the first processing object when an operation of selecting the first processing object is received, displays a line segment coupling the first processing object and the second processing object when an operation of selecting the second processing object is received, and displays a line segment coupling the second processing object and the third apparatus object when an operation of selecting the third apparatus object is received.

According to the configuration, objects selected by the operation among the plurality of objects displayed on the display screen are coupled by the line segments. Therefore, the user can easily recognize the selected objects.

APPENDIX 4

The printing system according to Appendix 2 or 3, in which when the operation unit receives the operation of associating the first processing object with the second processing object, the control unit displays the third apparatus object of the printing apparatus usable by the processing apparatus corresponding to the second apparatus object including the second processing object.

According to the configuration, when the processing apparatus that executes the second processing is selected, the third apparatus object of the printing apparatus that can be used by the processing apparatus is displayed. Therefore, the usability of the user can be improved.

APPENDIX 5

The printing system according to any one of Appendixes 2 to 4, in which the control unit acquires first information indicating a processing capability of the processing apparatus from the plurality of processing apparatuses and acquires second information indicating a request processing capability required by the printing apparatus to the processing apparatus from the plurality of printing apparatuses, and changes a display mode of the printing apparatus such that the processing capability of the processing apparatus corresponds to the request processing capability required by the printing apparatus based on the first information on the processing apparatus corresponding to the second apparatus object including the second processing object and a plurality pieces of the second information acquired from the plurality of printing apparatuses, respectively, when the operation unit receives the operation of associating the first processing object with the second processing object.

According to the configuration, when the first processing object and the second processing object are associated with each other, the display mode of the printing apparatus is changed such that the processing capability of the processing apparatus of the second apparatus object including the second processing object corresponds to the request processing capability requested by the printing apparatus. Therefore, the printing apparatus corresponding to the processing capability of the selected processing apparatus can be selected.

APPENDIX 6

An instruction apparatus for receiving an operation of designating a processing apparatus configured to execute raster image processor (RIP) processing on data to be printed and a printing apparatus configured to execute printing processing of printing an image based on the data to be printed on a print medium, the instruction apparatus including:

a display unit;

a control unit configured to display a display screen on the display unit, the display screen including a first apparatus object indicating the instruction apparatus, a plurality of second apparatus objects associated with a plurality of the processing apparatuses, respectively, and a third apparatus object associated with the printing apparatus; and an operation unit configured to receive an operation of associating the first apparatus object with the second apparatus object and an operation of associating the second apparatus object with the third apparatus object, in which the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

According to the configuration, by performing an operation of associating the objects displayed on the display screen with each other, it is possible to select the processing apparatus that executes the RIP processing and the printing apparatus that executes the printing processing, and it is possible to improve usability of a user.

APPENDIX 7

A control method of an instruction apparatus for receiving an operation of designating a processing apparatus configured to execute raster image processor (RIP) processing on data to be printed and a printing apparatus configured to execute printing processing of printing an image based on the data to be printed on a print medium, the control method of an instruction apparatus including:

displaying a display screen including a first apparatus object indicating the instruction apparatus, a plurality of second apparatus objects associated with a plurality of the processing apparatuses, respectively, and a third apparatus object associated with the printing apparatus;

receiving an operation of associating the first apparatus object with the second apparatus object and an operation of associating the second apparatus object with the third apparatus object; and generating control information for causing the processing apparatus corresponding to the second apparatus object associated with the first apparatus object to execute the RIP processing and causing the printing apparatus corresponding to the third apparatus object associated with the second apparatus object to execute the printing processing.

According to the configuration, by performing an operation of associating the objects displayed on the display screen with each other, it is possible to select the processing apparatus that executes the RIP processing and the printing apparatus that executes the printing processing, and it is possible to improve usability of a user.

APPENDIX 8

A program causing a computer to execute operations, the computer being mounted on an instruction apparatus configured to receive an operation of designating a processing apparatus configured to execute raster image processor (RIP) processing on data to be printed and a printing apparatus configured to execute printing processing of printing an image based on the data to be printed on a print medium, and the operations including:

displaying a display screen including a first apparatus object indicating the instruction apparatus, a plurality of second apparatus objects associated with a plurality of the processing apparatuses, respectively, and a third apparatus object associated with the printing apparatus;

receiving an operation of associating the first apparatus object with the second apparatus object and an operation of associating the second apparatus object with the third apparatus object; and generating control information for causing the processing apparatus corresponding to the second apparatus object associated with the first apparatus object to execute the RIP processing and causing the printing apparatus corresponding to the third apparatus object associated with the second apparatus object to execute the printing processing.

According to the configuration, by performing an operation of associating the objects displayed on the display screen with each other, it is possible to select the processing apparatus that executes the RIP processing and the printing apparatus that executes the printing processing, and it is possible to improve usability of a user.

What is claimed is:

1. A printing system comprising:

a plurality of processing apparatuses configured to execute raster image processor (RIP) processing on data to be printed;

one or a plurality of printing apparatuses configured to execute printing processing of printing an image based on the data to be printed on a print medium, the one or the plurality of printing apparatuses being separate from the plurality of processing apparatus and in communication with the plurality of processing apparatus via a network; and an instruction apparatus configured to receive an operation of designating the processing apparatus caused to execute the RIP processing and the printing apparatus caused to execute the printing processing, the instruction apparatus being separate from the plurality of processing apparatus and in communication with the plurality of processing apparatus via the network, wherein the instruction apparatus includes:

a display unit;

a control unit configured to display a display screen on the display unit of the instruction apparatus, the display screen including a first apparatus object indicating and visually representing the instruction apparatus, a plurality of second apparatus objects associated with and visually representing the plurality of processing apparatuses, respectively, and a third apparatus object associated with and visually representing the printing apparatus; and an operation unit configured to receive an operation of associating the first apparatus object with the second apparatus object and an operation of associating the second apparatus object with the third apparatus object, and the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

2. The printing system according to claim 1, wherein the RIP processing includes first processing and second processing, the control unit displays the plurality of second apparatus objects including a first processing object indicating the first processing and a second processing object indicating the second processing on the display unit, the operation unit receives an operation of associating the first apparatus object with the first processing object, an operation of associating the first processing object with the second processing object, and an operation of associating the second processing object with the third apparatus object, and the control unit generates the control information for causing the processing apparatus corresponding to the second apparatus object including the first processing object associated with the first apparatus object to execute the first processing, causing the processing apparatus corresponding to the second apparatus object including the second processing object associated with the first processing object to execute the second processing, and causing the printing apparatus corresponding to the third apparatus object associated with the second processing object to execute the printing processing.

3. The printing system according to claim 2, wherein the control unit displays a line segment coupling the first apparatus object and the first processing object when an operation of selecting the first processing object is received, displays a line segment coupling the first processing object and the second processing object when an operation of selecting the second processing object is received, and displays a line segment coupling the second processing object and the third apparatus object when an operation of selecting the third apparatus object is received.

4. The printing system according to claim 2, wherein when the operation unit receives the operation of associating the first processing object with the second processing object, the control unit displays the third apparatus object of the printing apparatus usable by the processing apparatus corresponding to the second apparatus object including the second processing object.

5. The printing system according to claim 2, wherein the control unit acquires first information indicating a processing capability of the processing apparatus from the plurality of processing apparatuses and acquires second information indicating a request processing capability required by the printing apparatus to the processing apparatus from the plurality of printing apparatuses, and changes a display mode of the printing apparatus such that the processing capability of the processing apparatus corresponds to the request processing capability required by the printing apparatus based on the first information on the processing apparatus corresponding to the second apparatus object including the second processing object and a plurality pieces of the second information acquired from the plurality of printing apparatuses, respectively, when the operation unit receives the operation of associating the first processing object with the second processing object.

6. An instruction apparatus for receiving an operation of designating a processing apparatus configured to execute raster image processor (RIP) processing on data to be printed and a printing apparatus configured to execute printing processing of printing an image based on the data to be printed on a print medium, the processing apparatus and the printing apparatus each being separate from the instruction apparatus, the instruction apparatus being in communication with the processing apparatus and the printing apparatus via a network, the instruction apparatus comprising:

a display unit;

a control unit configured to display a display screen on the display unit, the display screen including a first apparatus object indicating and visually representing the instruction apparatus, a plurality of second apparatus objects associated with and visually representing a plurality of the processing apparatuses, respectively, and a third apparatus object associated with and visually representing the printing apparatus; and an operation unit configured to receive an operation of associating the first apparatus object with the second apparatus object and an operation of associating the second apparatus object with the third apparatus object, wherein the control unit generates control information for causing the processing apparatus corresponding to the second apparatus object associated with the first apparatus object to execute the RIP processing and causing the printing apparatus corresponding to the third apparatus object associated with the second apparatus object to execute the printing processing.

7. A non-transitory computer-readable storage medium storing a program causing a computer to execute operations, the computer being mounted on an instruction apparatus configured to receive an operation of designating a processing apparatus configured to execute raster image processor (RIP) processing on data to be printed and a printing apparatus configured to execute printing processing of printing an image based on the data to be printed on a print medium, the processing apparatus and the printing apparatus each being separate from the instruction apparatus, the instruction apparatus being in communication with the processing apparatus and the printing apparatus via a network, the operations comprising:

displaying a display screen including a first apparatus object indicating and visually representing the instruction apparatus, a plurality of second apparatus objects associated with and visually representing a plurality of the processing apparatuses, respectively, and a third apparatus object associated with and visually representing the printing apparatus;

receiving an operation of associating the first apparatus object with the second apparatus object and an operation of associating the second apparatus object with the third apparatus object; and generating control information for causing the processing apparatus corresponding to the second apparatus object associated with the first apparatus object to execute the RIP processing and causing the printing apparatus corresponding to the third apparatus object associated with and visually representing the second apparatus object to execute the printing processing.

* * * * *